United States Patent [19]
Haquet et al.

[11] Patent Number: 5,758,699
[45] Date of Patent: Jun. 2, 1998

[54] PROCESS AND APPARATUS FOR THE UNIFORM DISTRIBUTION OF A COMMINUTED SOLID IN AN ENCLOSURE

[75] Inventors: Yvon Haquet, Fontaine la Mallet; Thierry Patureaux, Saint Romain de Colbosc, both of France

[73] Assignee: Total Raffinage Distribution, S.A., Puteaux, France

[21] Appl. No.: 735,373

[22] Filed: Oct. 21, 1996

[30] Foreign Application Priority Data

Oct. 20, 1995 [FR] France ................. 95 12334

[51] Int. Cl.⁶ .................................................. B65G 65/32
[52] U.S. Cl. ......................... 141/286; 141/67; 239/654; 239/687; 239/682; 414/301
[58] Field of Search ......................... 141/4, 67, 98, 141/286; 239/650, 654, 681, 687, 682, 684; 414/300, 301, 302, 786

[56] References Cited

U.S. PATENT DOCUMENTS

| | | | |
|---|---|---|---|
| 2,655,273 | 10/1953 | Snow | 214/17 |
| 3,668,115 | 6/1972 | Uhl et al. | 208/143 |
| 3,718,579 | 2/1973 | Uhl et al. | 208/143 |
| 3,949,908 | 4/1976 | Baillie | 222/193 |
| 3,995,753 | 12/1976 | Miller et al. | 214/17 CB |
| 4,306,829 | 12/1981 | Loutaty et al. | 414/301 |
| 4,564,328 | 1/1986 | Loutaty et al. | 414/301 |

FOREIGN PATENT DOCUMENTS

| | | |
|---|---|---|
| A-007 854 | 2/1980 | European Pat. Off. . |
| A-116 246 | 8/1984 | European Pat. Off. . |
| A 2 087 890 | 12/1971 | France . |
| A-2 153 380 | 5/1973 | France . |
| A-2 288 560 | 5/1976 | France . |
| A 2 319 427 | 2/1977 | France . |
| A-2538 795 | 7/1984 | France . |

*Primary Examiner*—Henry J. Recla
*Assistant Examiner*—Steven O. Douglas
*Attorney, Agent, or Firm*—Frommer Lawrence & Haug LLP

[57] ABSTRACT

A process for the uniform distribution of a comminuted solid in an enclosure into which the solid falls essentially vertically onto a mobile mechanism (particularly useful for charging catalyst particles to a reactor vessel) comprising deflector elements rotated around the same shaft and disposed on at least two vertically displaced levels. On each level is provided the same number of deflector elements of essentially identical shape, the deflector elements on the different levels being vertically disposed exactly above each other and, on each level, the deflector elements are rotated at the same speed so as to remain disposed vertically with respect to each other during the entire charging process.

15 Claims, 3 Drawing Sheets

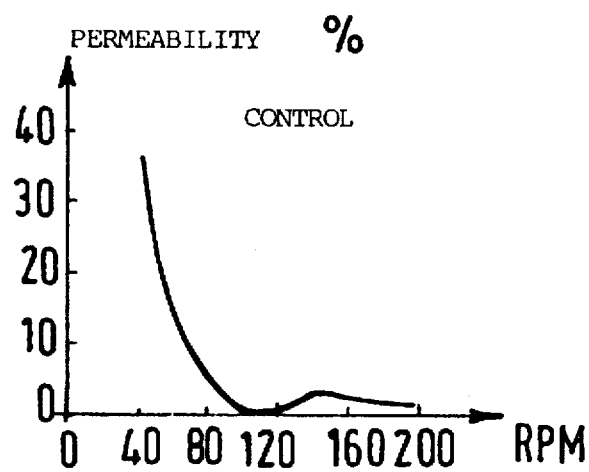
FIG. 4
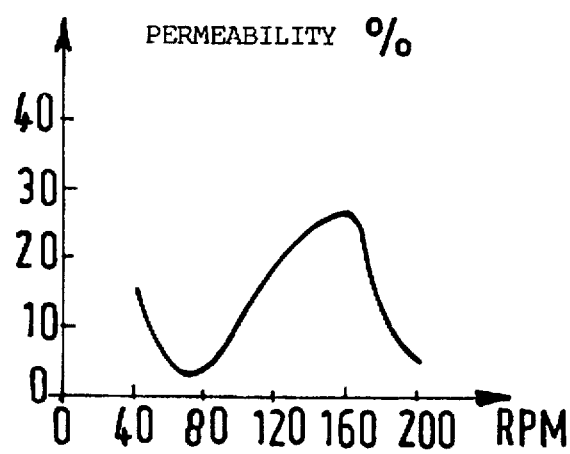 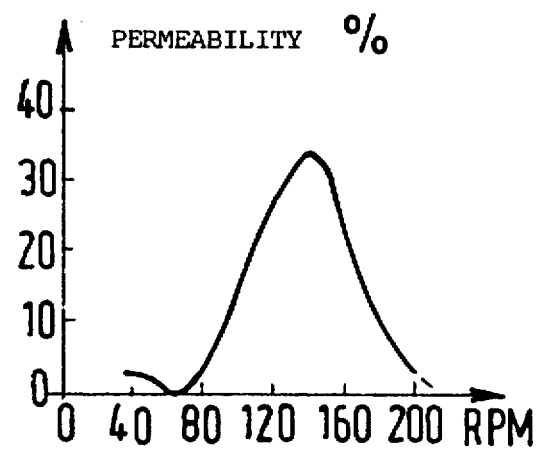
FIG. 5          FIG. 6

PROCESS AND APPARATUS FOR THE UNIFORM DISTRIBUTION OF A COMMINUTED SOLID IN AN ENCLOSURE

RELATED APPLICATION

This application claims priority to French Application No. 95 12334, filed Oct. 20, 1995, incorporated herein by reference.

BACKGROUND OF THE INVENTION

1. Field of the Invention

The invention relates to a process and to an apparatus for the uniform distribution of a comminuted solid in an enclosure. More particularly, it relates to the filling of silos with grain or of chemical reactors with a comminuted catalyst.

2. Description of the Related Art

By a comminuted solid is meant a solid in spherical form or in the form of grains, cylinders, pellets, small rods, or, more generally, of particles of any shape but of relatively small dimensions. The catalysts used in the conversion of chemicals or hydrocarbons, for example in the reforming, cracking and desulfurization of hydrocarbons or petroleum fractions and in hydrotreating processes in general, are in spherical form or in the form of extrudates or multilobal particles of small dimensions.

In the filling of both silos and catalytic reactors, it is important that the volume intended to contain the comminuted solid be occupied as efficiently as possible. In particular, in the case of catalysts, it is advantageous not only to pack a maximum amount of catalyst into a minimum of space as homogeneously and as uniformly as possible ("dense" packing), but also to perform the charging as quickly as possible.

Different techniques have therefore been envisaged to increase paring density in silos or reactors. The following has been proposed:

homogeneous distribution of grains in an enclosure by sprinkling said grains across the entire cross-section of the enclosure (see U.S. Pat. No. 2,655,273);

stationary equipment wherein the particles are dispersed with the aid of compressed air (see, for example, FR-A-2 288 560 [or equivalent U.S. Pat. No. 3,949,908]);

rotary devices for direct particle dispersion (see, in particular, FR-A-2 087 890 [or equivalent U.S. Pat. No. 3,668,115], FR-A-2 153 380 [or equivalent U.S. Pat. No. 3,718,579] and FR-A-2 319 427 [or equivalent U.S. Pat. No. 3,995,753]).

Applicants' assignee, too, has proposed methods of dense packing which use a mobile mechanism comprising a shaft, made to rotate by a moving means, and several tiers of flexible deflecting elements such as straps (see EP-A-007 854 [or equivalent U.S. Pat. No. 4,306,829] and EP-A-116 246 [or equivalent U.S. Pat. No. 4,564,328]). These and all other patents specifically identified by number in this application are incorporated by reference.

Such devices, and more generally rotary devices, do not permit continuous charging of reactors and do not provide a uniform filling profile. In fact, as will be seen in detail in the following, the speed of rotation of the mobile mechanism must be modified as the enclosure is being filled. This modification presents severe technical problems to operators, however, because it is difficult to predict the effect of the change in speed of rotation on packing quality. A very minor change in speed of rotation can disturb the sprinkling, namely the quantity of particles deflected by the mobile mechanism.

It is therefore absolutely necessary, after each change in speed of rotation of the mobile mechanism, to stop the charging during the following minutes and to send operators into the enclosure to be charged to verify visually the packing quality brought about by these changes until these changes produce an optimum packing quality. These frequent stoppages and checks not only pose many technical problems (presence of chemicals, inert reactor atmosphere, etc.), but also economical ones, because they stop reactor operation while at the same time delaying the production cycle.

OBJECTS AND SUMMARY OF THE INVENTION

The present invention has as an object the limitation of these major drawbacks. Applicants have, in fact, established that the relative positions of the straps or, more generally, of the deflector elements linked to the drive shaft at different levels and caused to rotate by it, are of essential importance.

More precisely, applicants have established that a homogeneous and optimum distribution of the grains can be obtained regardless of the rotation regimen of the mobile mechanism. This mechanism is no longer disposed so as to distribute the straps of the different levels of the mechanism in homogeneous manner, as in the prior art, and to maximize the surface area presented to the grains and minimize the empty space presented by the rotating mechanism, but, on the contrary, with the deflector elements at each level disposed exactly above each other and not, as in the prior art, displaced relative to each other; so as to confer to the entire mobile mechanism of the present invention a larger amount of empty space than that achieved with the deflector element disposition adopted in the prior art.

For purposes of the present description, by "amount of empty space of the mobile mechanism" is meant the ratio (in %) of surface area not covered by the deflectors to the total projected surface area of the mobile mechanism once the deflector elements are deployed in the enclosure. In other words, this latter ratio is that portion of the cross-sectional surface area swept by the rotating deflectors of the mobile mechanism other than the surface area of the deployed deflectors which instantaneously projected thereon overlaps such cross-sectional area, relative to the total of such cross-sectional surface area.

The effect of this novel organization of the deflectors of the mobile mechanism which in accordance with strap dimensions generally used confers to it an empty space of 30 to 80% is that, quite surprisingly, the filling of a reactor by the process according to the present invention makes it possible to achieve dense packing similar to that obtained according to applicant's assignee's prior art and, in addition, better packing quality and a preferentially horizontal orientation of the catalyst grains thus improving contact between the catalyst and the liquids or gases.

Moreover, the disposition of the deflectors used according to the invention permits better control of machine parameters while facilitating control of the permeability of the mobile mechanism. The number of interventions needed for checks and adjustments and the charging time are thus reduced.

By permeability to the grains is meant the quantity (in %) of catalyst grains that pass through the rotating mobile mechanism without being deflected by collision with the strap.

Hence, the present invention has as a preferred embodiment a process for the uniform distribution of a comminuted solid in an enclosure wherein the solid falls on a mobile mechanism comprising a shaft, maintained in rotation by a driving means, and deflector elements integral and rotating with said shaft and disposed around said shaft on several vertically displaced levels, characterized by the fact that each level is provided with the same number of deflector elements of essentially the same shape, that said deflector elements are disposed symmetrically relative to the rotating shaft, that vertically the deflector elements at each level are disposed exactly above each other and that generally the mobile mechanism assembly presents an empty space of 30 to 80%.

Preferably, the deflector elements move at a speed that is as slow as possible, generally from about 25 to about 140 and preferably from 40 to 140 revolutions per minute. This is particularly advantageous in the charging of large reactors (diameter greater than 5 meters), because it avoids any risk of grain breaking or attrition which could occur as a result of impact at the end of the deflectors caused by excessive speed.

The application of the process and of the apparatus according to the invention to the charging of enclosures having a diameter greater than 5 meters constitutes another preferred embodiment of the invention.

The various deflector levels of which there are two or more and preferably three or four are spaced at a distance of 2 to 15 centimeters and preferably 4 to 8 centimeters from each other.

The deflectors of the mobile mechanism according to the present invention can have different and varied shapes, but advantageously are flexible straps such as those described in EP-A-116 246 [or equivalent U.S. Pat. No. 4,564,328]. Each tier of straps contains at least two and preferably four to twelve straps which are disposed around the rotating shaft and preferably have identical shapes and dimensions.

When the deflector elements are straps, their longitudinal dimension can be from 10 centimeters to 2 meters and preferably from 10 centimeters to 1 meter.

Hence, the present invention makes it possible to derive major advantages both in packing quality and for the operators, particularly when charging chemical reactors. In the latter case, in addition to achieving the preferential horizontal orientation of the catalyst grains, the calculated slope of the catalyst beds toward the horizontal, in reactors charged according to the present invention, is less than 5 degrees. Such results have never been obtained under prior-art operating conditions. Moreover, the number of interventions is reduced while accurate adjustments of the rotation speed can be made depending on the height of the catalyst drop into the enclosure to be charged.

Another embodiment of the present invention is an apparatus for the uniform distribution of a comminuted solid in an enclosure, said apparatus comprising at its upper part a means for feeding the solid to be distributed, said means pouring the solid into the enclosure essentially vertically, and a mobile mechanism disposed in the enclosure below the feeding means, said mobile mechanism comprising a rotating shaft, driven by a driving means, and integral deflector elements rotating with said shaft and disposed on several levels displaced vertically around said shaft, said apparatus being characterized by the fact that each level is provided with the same number of deflector elements of substantially identical shape, that vertically said deflector elements are disposed exactly above each other, and that the means of linking the deflector elements to the shaft are such that at each level said elements have the same speed of rotation and remain vertically disposed relative to each other during all enclosure charging processes.

As described in earlier patents granted to applicants' assignee, the means of bringing about the rotation of the deflector elements thus comprises a vertical drive shaft to which the flexible deflector elements are linked in a manner such that under the effect of a centrifugal force they can rise or open up at an angle to the shaft axis.

The deflectors of the mobile mechanism can have any shape known from the prior art: continuous disks, circular sectors, portions of a helix, preferably rectangular, triangular or trapezoidal straps etc. The cross-section of the deflector elements can also have any shape known from the prior art: flat, rectangular, cylindrical, helical and preferably rectangular.

BRIEF DESCRIPTION OF THE DRAWINGS

In this specification and in the accompanying drawings, we have shown and described preferred embodiments of our invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

FIGS. 4, 5 and 6 are diagrams illustrating the results obtained which will be described hereinbelow.

DETAILED DESCRIPTION OF THE INVENTION

Figure 1:
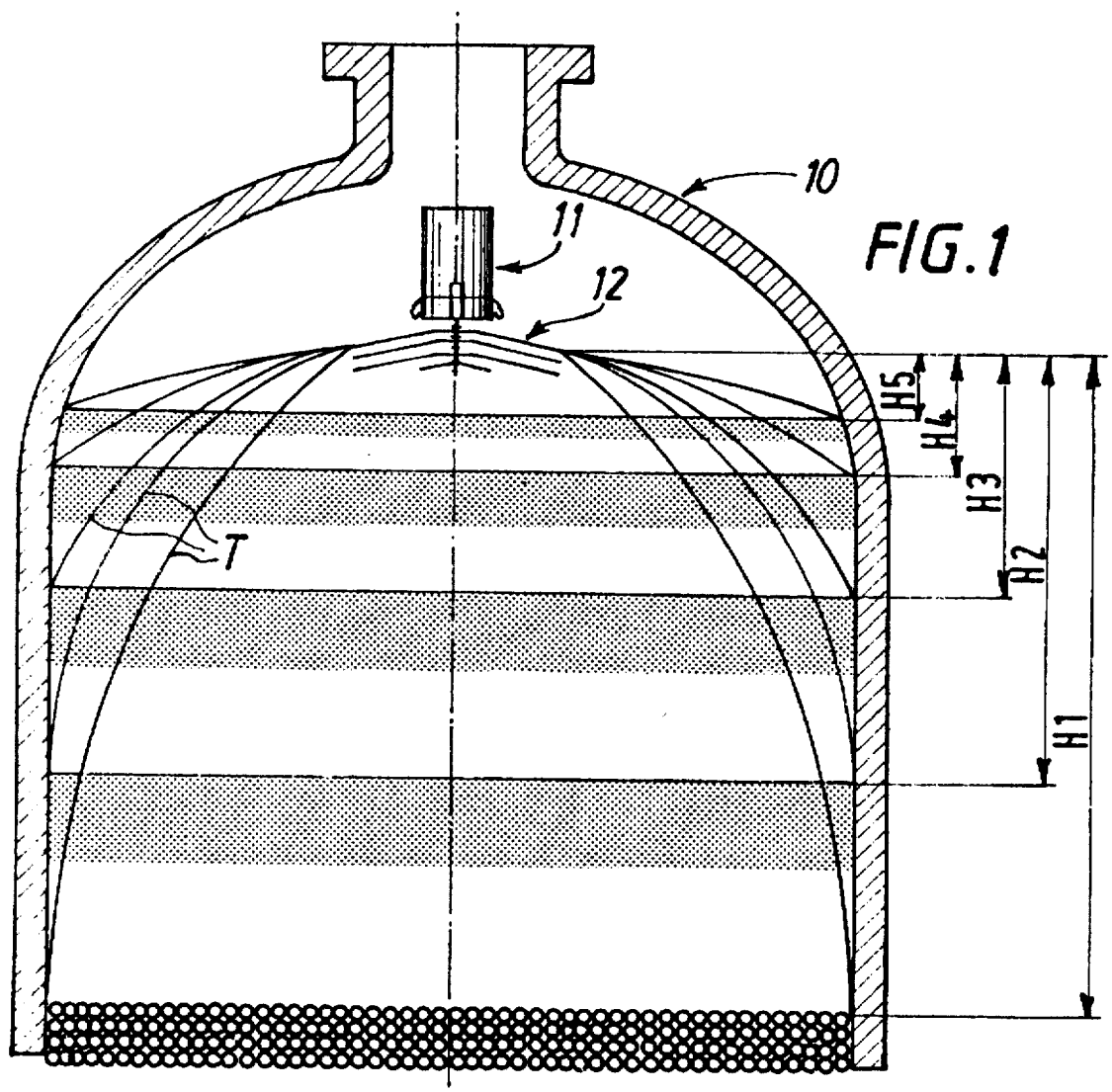
FIG. 1 is a schematic view of an enclosure equipped with a charging apparatus of the prior art.
Figure 2:
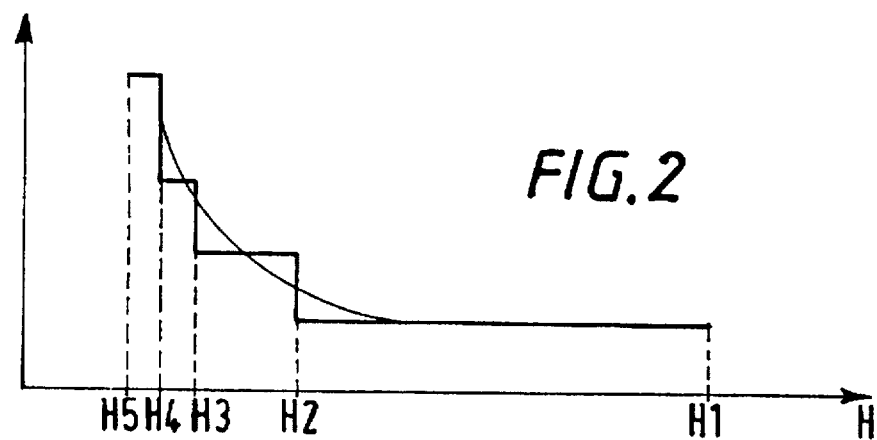
FIG. 2 is a diagram showing the speeds of rotation of the mobile mechanism of the apparatus of FIG. 1 as a function of the enclosure filling level.

FIG. 1 represents an enclosure 10 equipped with a charging device 11 comprising a mobile mechanism 12 of the type described in EP-A-007 854 [or equivalent U.S. Pat. No. 4,306,829], or EP-A-116 246 [or equivalent U.S. Pat. No. 4,564,328]. As can be seen in the drawing, the length of paths T of the particles charged to the enclosure, for example catalyst particles, varies as the level of said particles rises in the enclosure. It is thus necessary to interrupt the charging operation several times to adjust the speed of rotation of the mobile mechanism, said speed increasing as the enclosure fills up from a first level $H_1$ to the subsequent levels $H_2, \ldots H_5$.

As explained hereinbelow, the charging interruptions and the modifications of the speed of rotation of the mobile mechanism cause numerous drawbacks which the present invention proposes to remedy.

Figure 3:
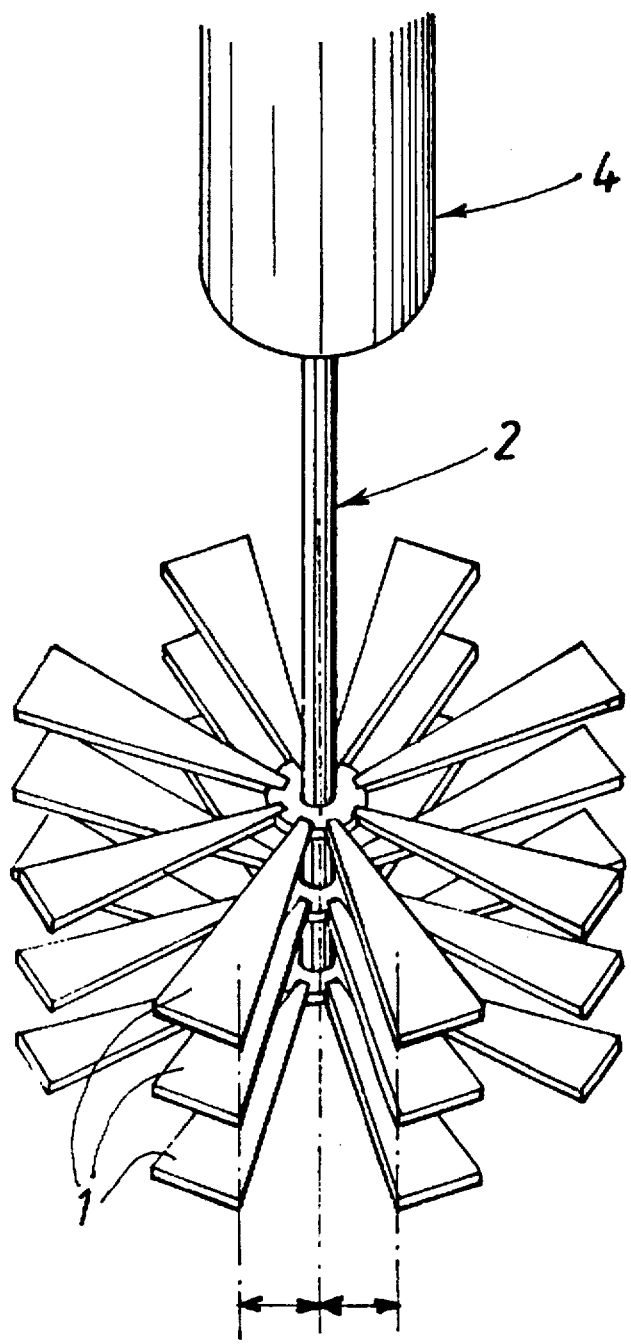
FIG. 3 is a schematic view of an apparatus according to the invention.

FIG. 3 shows the mobile mechanism according to the invention intended to be disposed at the upper part of an enclosure to be filled homogeneously with a comminuted solid. In the present case, said mobile mechanism comprises three assemblies of eight semi-rigid straps 1 disposed at three vertically displaced levels. Here straps 1 have a trapezoidal shape and are linked to a common drive shaft 2 around horizontal axes by which they are connected, for example, in pivoting fashion, so that they can rise under the effect of centrifugal force when they are being rotated by the driving means. For the manner in which straps 1 are connected to shaft 2 refer, for example, to the aforecited European Patent No. 007 854 [or equivalent U.S. Pat. No. 4,306,829].

A pipe, not shown, feeds a storage bin 4 disposed above straps 1 so that the particles to be distributed fall on said straps.

According to the invention, straps 1 on the different tiers of the mobile mechanism are disposed vertically exactly above each other and when moved by the same drive shaft 2 they remain in this same relative position during the entire course of particle distribution.

The diagrams in FIGS. 4, 5 and 6 refer to three tests intended to measure the permeability of a mobile mechanism and carried out, respectively, with different dispositions of the three assemblies of eight straps constituting the mobile mechanism. With the exception of the speed of rotation of the revolving mechanism, the other operating conditions remained the same during the three tests.

These diagrams show the variation of permeability, namely of the quantity (in %) of catalyst grains passing through said mobile mechanism without being deflected by a deflector element of said mechanism, as a function of the speed of rotation of the mobile mechanism.

In the diagram of FIG. 4, it can be seen that, for a mobile mechanism according to the present invention, namely with the straps of each level of said mechanism disposed exactly above each other (empty space of the mobile mechanism equal to about 50%), the permeability decreases rapidly and regularly with increasing speed of the mechanism, becoming nearly nil above 100 revolutions per minute. This results in homogeneous distribution of the catalyst throughout the entire volume of the enclosure and in better control of regulation parameters.

In the diagrams of FIGS. 5 and 6, referring to two different strap installations with straps not disposed exactly above each other but, on the contrary, with the tiers displaced at an angle relative to each other so as to oppose the passage of the catalyst grains by presenting to them a maximum of surface area (empty space of the mobile mechanism less than 10%), it can be seen that the permeabilities vary in erratic manner as a function of the speed of rotation of the mechanism. This results in difficult control of the speed of rotation of the mechanism and thus of the permeability to the grains.

The comparative example described hereinbelow also illustrates the advantages of the invention.

EXAMPLE

Two essentially identical chemical reactors, R1 and R2, with a diameter of about 5 meters and a height of about 6.5 m were filled with catalyst grains having the shape of an extrudate with a mean diameter of 1.5 mm and an average length of 4 mm. The catalyst charging rate was the same in the two cases and amounted to about 15 met. tons per hour.

The two reactors were charged using the same mobile mechanism. All straps of the mechanism were identical, distributed on three levels and, on each of said levels, disposed symmetrically relative to the rotating shaft. There were eight straps per level, all of trapezoidal shape. The straps were made of reinforced rubber and were 70 cm long, their large and small widths were 5 and 10 cm, respectively, and they were 0.6 cm thick.

Each of the two charging operations was carried out with the mobile mechanism set for a different empty space, as indicated in Table 1, hereinbelow. This was achieved with different dispositions of the straps on each of the three levels of the mechanism. The 52% empty space value (mobile mechanism set for charging reactor R2) is the maximum value obtained for this type of straps and, hence, corresponds to a strap disposition according to the present invention. The 4% empty space value (mobile mechanism set for the charging reactor R1) corresponds to a strap disposition of the type of applicant's assignee's prior art (regarding this subject, see French Patent FR-A-2 538 795 [or equivalent U.S. Pat. No. 4,564,328]).

The results obtained are collected in the following Table 1.

TABLE 1

|  | R1 | R2 |
|---|---|---|
| MOBILE MECHANISM |  |  |
| Level 1, % of empty space | 52 | 52 |
| Level 2, % of empty space | 52 | 52 |
| Level 3, % of empty space | 52 | 52 |
| - % of empty space of mobile mechanism | 4 | 52 |
| SPEED OF ROTATION |  |  |
| (in revolutions per minute) |  |  |
| - at a height of 1 m | 180 | 130 |
| - at a height of 4 m | 130 | 80 |
| - at a height of 6 m | 95 | 60 |
| CHARGING |  |  |
| - Duration (hours) | 9 | 7 |
| - Number of interventions | 6 | 3 |
| (needed to check quality and adjustments) |  |  |
| PACKING QUALITY |  |  |
| - gain in density compared to conventional charging through a hose (%) | 18.5 | 18.5 |
| - Maximum slope obtained (o) | 6 | 3.2 |

It can be seen that the charging performed according to the present invention (reactor R2) is particularly advantageous and, while it gave a packing density identical to that of applicants' assignee's prior art, it also produced the following, relative to said prior art:

a reduction in speed of rotation of the mobile mechanism of about 30%;

a reduction in charging time of about 20%;

a 50% reduction in the number of interventions in the reactor, for checks and adjustments;

a gentler slope of the catalyst bed, namely optimized packing quality with the catalyst grains preferentially oriented horizontally.

We claim:

1. Apparatus in the form of a mobile mechanism for the uniform distribution of comminuted solids in an enclosure when positioned in such enclosure below a source for feeding the solids essentially vertically into the enclosure onto the mobile mechanism disposed therebelow, said mobile mechanism comprising a shaft for vertical rotation, a rotary mechanism for driving said shaft, deflector elements attached to rotate with said shaft, a multiplicity of such elements being disposed about said shaft at each of a multiplicity of levels displaced along said shaft, the same number of deflector elements of essentially identical shape being at each level, the deflector elements at any given level being disposed about the shaft so that each has at the other levels a corresponding deflector element disposed only vertically above and/or below each such deflector element, the deflector elements being connected to the shaft in a manner such that at each level said elements have the same speed of rotation and remain disposed vertically relative to each other during vertically oriented rotation of the shaft.

2. Apparatus according to claim 1, wherein the levels of the deflector elements are spaced at a distance of 2 to 15 centimeters from each other.

3. Apparatus according to claim 2, wherein the deflector elements are flexible straps.

4. Apparatus according to claim 3, wherein the number of flexible straps disposed at each level is from 2 to 12, with said straps being disposed symmetrically about the shaft.

5. Apparatus according to claim 4, wherein the longitudinal dimension of the straps is from 10 centimeters to 2 meters.

6. Apparatus according to claim 1, wherein the deflector elements are linked to the shaft so that they can rise under the effect of a centrifugal force.

7. Apparatus according to claims 6, wherein the deflector elements are disposed between three or four vertically displaced levels.

8. Apparatus according to claim 7, wherein the levels of the deflector elements are spaced at a distance of 4 to 8 centimeters from each other.

9. Apparatus according to claim 8, wherein the deflector elements are flexible straps.

10. Apparatus according to claim 9, wherein the number of flexible straps disposed at each level is from 4 to 12, with said straps being disposed symmetrically about the shaft.

11. Apparatus according to claims 10, wherein the longitudinal dimension of the straps is from 10 centimeters to 1 meter.

12. Process for charging an enclosure by the uniform distribution therein of comminuted solid particles, comprising positioning a mobile mechanism in the upper portion of said enclosure, feeding the solid particles so as to fall onto said mobile mechanism, which mobile mechanism comprises a shaft, a drive mechanism rotating said shaft, deflector elements attached to and rotating together with said shaft and being disposed symmetrically around the shaft with a multiplicity at each of several vertically displaced levels, each level being provided with the same number of deflector elements having essentially the same shape, the deflector elements on each level having corresponding deflector elements on each other level which are disposed only vertically above and/or below each other, and the amount of empty space which the deployed deflector elements of the mobile mechanism present therebetween to falling solid particles ranging from 30 to 80, expressed in %.

13. Process according to claim 12, wherein the speed of rotation of deflector elements is from 25 to 140 revolutions per minute.

14. Process according to claim 12, wherein the speed of rotation of deflector elements is from 40 to 140 revolutions per minute.

15. Process utilizing an apparatus for charging enclosures having a diameter greater than 5 meters wherein said apparatus is in the form of a mobile mechanism for the uniform distribution of comminuted solids in such enclosures when positioned therein below a source for feeding the solids essentially vertically into the enclosure onto the mobile mechanism disposed therebelow, said mobile mechanism comprising a shaft for vertical rotation, a rotary mechanism for driving said shaft, deflector elements attached to rotate with said shaft, a multiplicity of such elements being disposed about said shaft at each of a multiplicity of levels displaced along said shaft, the same number of deflector elements of essentially identical shape being at each level, the deflector elements at any given level being disposed about the shaft so that each has at the other levels a corresponding deflector element disposed only vertically above and/or below each such deflector element, the deflector elements being connected to the shaft in a manner such that at each level said elements have the same speed of rotation and remain disposed vertically relative to each other during vertically oriented rotation of the shaft, the levels of the deflector elements being spaced at a distance of 2 to 15 centimeters from each other, the deflector elements being flexible straps, and the number of flexible straps disposed at each level being from 2 to 12 in number with said straps being disposed symmetrically about the shaft.

* * * * *